(12) United States Patent
Parsons et al.

(10) Patent No.: US 10,746,306 B2
(45) Date of Patent: Aug. 18, 2020

(54) KNIFE GATE VALVE LINER

(71) Applicant: Emerson Vulcan Holding LLC, St. Louis, MO (US)

(72) Inventors: Darren Parsons, Cambewarra (AU); John Sidney Moreland, North Nowra (AU)

(73) Assignee: Emerson Vulcan Holding LLC, St. Louis, MO (US)

( * ) Notice: Subject to any disclaimer, the term of this patent is extended or adjusted under 35 U.S.C. 154(b) by 0 days.

(21) Appl. No.: 16/210,880

(22) Filed: Dec. 5, 2018

(65) Prior Publication Data

US 2019/0107209 A1 Apr. 11, 2019

Related U.S. Application Data

(62) Division of application No. 15/171,918, filed on Jun. 2, 2016, now abandoned.

(60) Provisional application No. 62/190,099, filed on Jul. 8, 2015, provisional application No. 62/170,602, filed on Jun. 3, 2015.

(51) Int. Cl.
*F16K 3/02* (2006.01)
*F16K 27/04* (2006.01)

(52) U.S. Cl.
CPC .......... *F16K 3/0227* (2013.01); *F16K 3/0263* (2013.01); *F16K 3/0281* (2013.01); *F16K 27/044* (2013.01)

(58) Field of Classification Search
CPC .... F16K 3/0263; F16K 3/0227; F16K 27/044; F16K 3/0281
USPC .................................................. 251/326–329
See application file for complete search history.

(56) References Cited

U.S. PATENT DOCUMENTS

| | | | |
|---|---|---|---|
| 2,857,129 | A | 10/1958 | Overholser et al. |
| 2,942,841 | A | 6/1960 | Stillwagon |
| 3,993,092 | A | 11/1976 | Still |
| 4,009,727 | A | 3/1977 | Bailey |
| 4,026,517 | A | 5/1977 | Still |
| 4,051,862 | A | 10/1977 | Haytayan |
| 4,051,863 | A | 10/1977 | Still |
| 4,112,969 | A | 9/1978 | Still |
| 4,377,274 | A | 3/1983 | Mayhew, Jr. |
| 4,646,407 | A | 3/1987 | Mayhew, Jr. |

(Continued)

FOREIGN PATENT DOCUMENTS

AU 2014271246 A1 1/2015

OTHER PUBLICATIONS https://www.slideshare.net/anupshah76/newcon-general-productsheet, published Jul. 17, 2013 (Year: 2013).*

(Continued)

*Primary Examiner* — Michael R Reid
(74) *Attorney, Agent, or Firm* — Quarles & Brady LLP

(57) ABSTRACT

Embodiments of the invention provide a housing assembly for a knife gate valve with a knife gate. The housing assembly includes a valve body defining a passageway and having a first body half and a second body half, and a one-piece liner arranged between the first body half and the second body half. A first part of the one-piece liner includes a first chest portion, a first liner bore, and a first sealing bead that is configured to engage the knife gate and extends circumferentially around the passageway. The first sealing bead defines a varying protrusion height as the first sealing bead extends around the passageway.

20 Claims, 10 Drawing Sheets

(56) References Cited

U.S. PATENT DOCUMENTS

| | | |
|---|---|---|
| 4,881,719 A | 11/1989 | Bowman |
| 4,951,919 A | 8/1990 | Haglund et al. |
| 5,141,361 A | 8/1992 | Fontaine |
| 5,197,512 A | 3/1993 | Lev |
| 5,205,317 A | 4/1993 | Neuerberg et al. |
| 5,330,158 A | 7/1994 | Ellich et al. |
| 5,549,278 A | 8/1996 | Sidler |
| 5,979,874 A | 11/1999 | Gambetta et al. |
| 7,100,893 B2 | 9/2006 | Williams et al. |
| 7,815,170 B2 | 10/2010 | Devine, Jr. et al. |
| 2005/0285071 A1 | 12/2005 | Williams et al. |
| 2014/0332707 A1 | 11/2014 | Reilly et al. |

OTHER PUBLICATIONS

NewCon Co., Your final knife gate valve solution product sheet, undated, 2 pages, <www.newconvalve.com>. Jul. 2013.

\* cited by examiner

KNIFE GATE VALVE LINER

RELATED APPLICATIONS

This application is a divisional of co-pending U.S. patent application Ser. No. 15/171,918, filed on Jun. 2, 2016, which claims priority under 35 U.S.C. § 119 to U.S. Provisional Patent Application No. 62/170,602 filed on Jun. 3, 2015, and to U.S. Provisional Patent Application No. 62/190,099 filed on Jul. 8, 2015, the entire contents of which are incorporated herein by reference.

BACKGROUND

Gate valves or knife gate valves are used to control the flow of fluid, such as process fluid, in a pipeline. These valves include a housing having a fluid passageway and a moveable gate for opening or closing the fluid passageway. The gate is configured to slide within a liner located within the housing. In an open position, the gate is moved to allow flow through the fluid passageway between inlet and outlet ports of the valve. In a closed position, the gate is moved to close the fluid passageway and inhibit flow. The liner is usually one-piece and completely lines the inside of the valve. One-piece liners prevent the metal portion of the valve body from wearing through. For "cast in place" liners, once these liners wear out, the valve is usually thrown away.

SUMMARY OF THE INVENTION

Some embodiments of the invention provide a housing assembly for a knife gate valve with a knife gate. The housing assembly includes a valve body assembly defining a passageway having an axis and having a first body half and a second body half. The first body half and the second body half each including a flange recessed portion defining a flange recess surface. Each of flange recess surfaces includes a first flange surface portion, a second flange surface portion, and a raised flange bead arranged between the first flange surface portion and the second flange surface portion. The housing assembly further includes a one-piece liner arranged between the first body half and the second body half and having a first liner flange engaged with the first flange surface portion, the raised flange bead, and the second flange surface portion of the first body half, and a second liner flange engaged with the first flange surface portion, the raised flange bead, and the second flange surface portion of the second body half. A first part of the one-piece liner includes a first chest portion that engages the knife gate and an inside surface of the flange recessed portion of the first body half, a first liner bore portion that extends between the first chest portion and the first liner flange and that engages a radially inner surface of the flange recessed portion of the first body half, and a first sealing bead that is configured to engage the knife gate and extends circumferentially around the passageway. The first sealing bead defines a varying protrusion height as the first sealing bead extends around the passageway.

Some embodiments of the invention provide a housing assembly for a knife gate valve with a knife gate. The housing assembly includes a valve body assembly that defines a passageway having an axis and having a first body and a second body. Each of the first body and the second body includes a flange surface and a flange recessed portion that protrudes radially inward relative to the flange surface. The housing assembly further includes a one-piece liner arranged between the first body and the second body. The one-piece liner defines a first liner recess that receives and wraps around the flange recessed portion of the first body, a second liner recess that receives and wraps around the flange recessed portion of the second body, a chest portion that extends from the first and second liner recesses to engage the knife gate, a first sealing bead protruding axially away from the flange recessed portion of the first body and extending circumferentially around the passageway, and a second sealing bead protruding axially away from the flange recessed portion of the second body and extending circumferentially around the passageway. An axial height of the first sealing bead varies as the first sealing bead extends around the passageway, and an axial height of the second sealing bead varies as the second sealing bead extends around the passageway.

Some embodiments of the invention provide a housing assembly for a knife gate valve. The housing assembly includes a valve body assembly that defines a passageway having an axis and having a first body and a second body. Each of the first body and the second body includes a flange surface and a flange recessed portion that protrudes radially inward relative to the flange surface. Each of the flange recessed portions includes a flange recessed surface that includes a first flange surface portion, a second flange surface portion, and a raised flange bead arranged between the first flange surface portion and the second flange surface portion. The housing assembly further includes a one-piece liner arranged between the first body and the second body. The one-piece liner includes a first liner bore surface, a first liner flange, a second liner bore surface, a second liner flange, a chest portion, and a gate slot. The gate slot includes a first sealing bead arranged on a first inner surface of the gate slot radially outwardly from the first liner bore surface and a second sealing bead arranged on a second inner surface of the gate slot radially outwardly from the second liner bore surface. The first sealing bead defines a varying axial height as the first sealing bead extends circumferentially around the first inner surface. The second sealing bead defines a varying axial height as the second sealing bead extends circumferentially around the second inner surface.

DETAILED DESCRIPTION OF THE INVENTION

Figure 1:
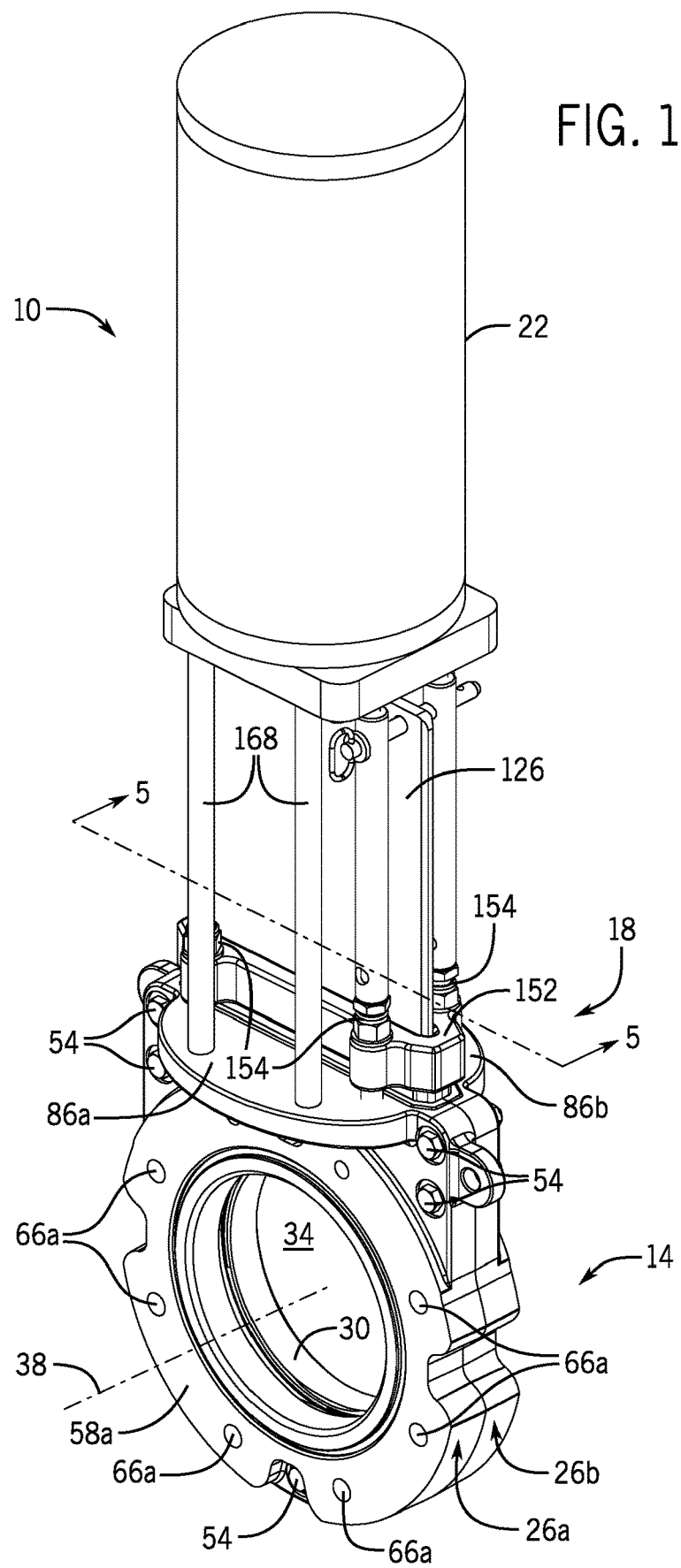
FIG. 1 is a perspective view of a knife gate valve according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein.

The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a knife gate valve 10 according to one embodiment of the invention. The knife gate valve 10 includes a valve body assembly 14, a gland assembly 18 and a gate actuation mechanism 22. The valve body assembly 14 includes a first body half 26a, a second body half 26b symmetrical to the first body half 26a, and a liner 30 arranged between the first body half 26a and the second body half 26b. The valve body assembly 14 defines a passageway 34 having an axis 38 along which process fluid can flow bi-directionally.

Figure 3:
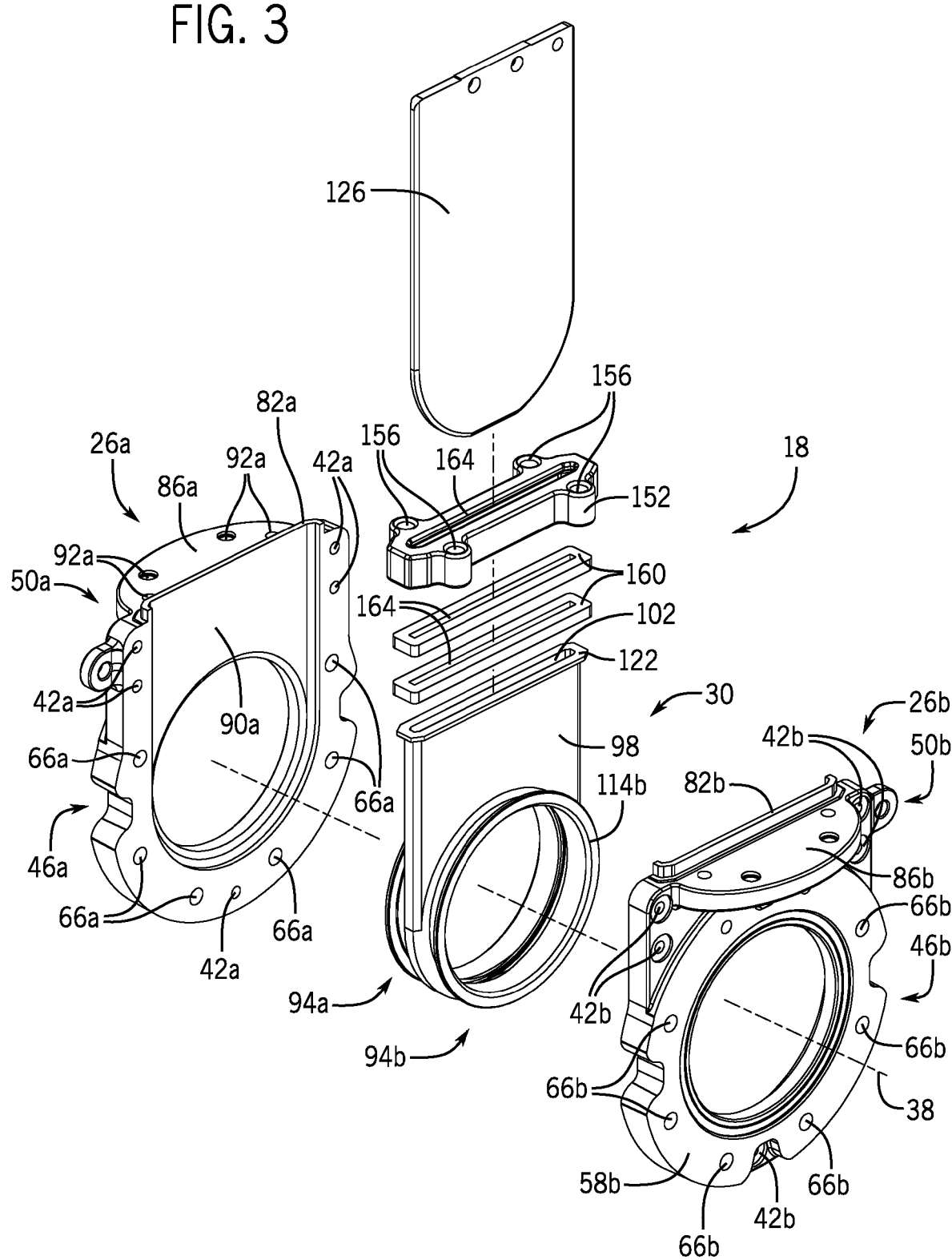
FIG. 3 is an exploded perspective view of a valve body assembly and a gate of the knife gate valve of FIG. 1.

The first and second body halves 26a, 26b are symmetric, and the following description of the first body half 26a also applies to the second body half 26b. The first body half 26a and the second body half 26b include similar features which are identified with like reference numerals and distinguished by the suffix "a" and "b" in the figures. As shown in FIG. 3, the first body half 26a includes a plurality of joining apertures 42a, a flange portion 46a, and a gland portion 50a. The plurality of joining apertures 42a are each arranged to align with a corresponding joining aperture 42b on the second body half 26b. The joining apertures 42a, 42b are each configured to receive a fastening element 54 (see FIG. 1) for joining the first body half 26a and the second body half 26b. In one embodiment, the fastening elements 54 are bolts secured by nuts. The first body half 26a and the second body half 26b are fabricated from a metal material, such as iron, stainless steel, or other ferrous or non-ferrous alloys.

Figure 4:
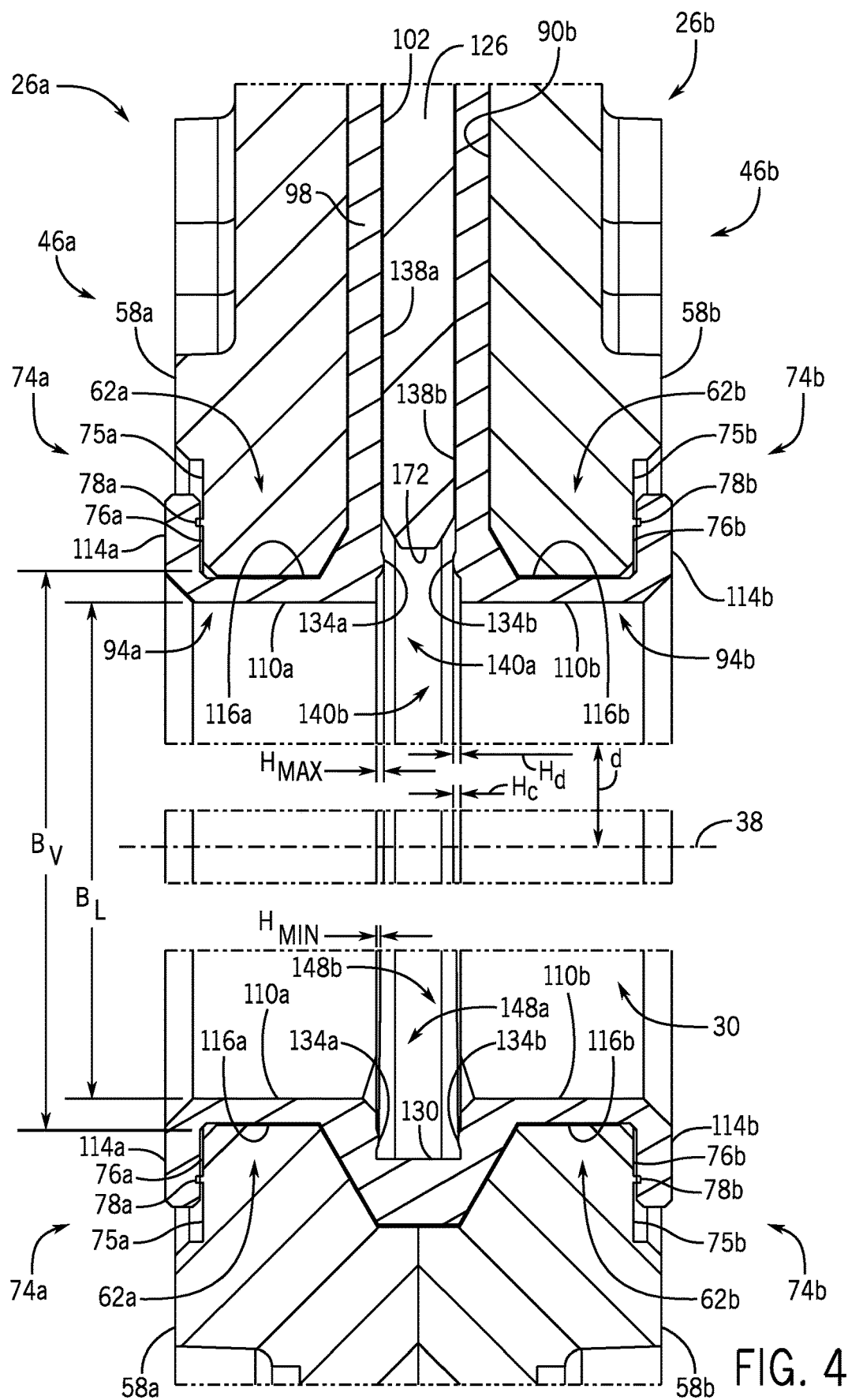
FIG. 4 is a cross-sectional view of the knife gate valve of FIG. 3 taken along line 4-4 with the gate in a first position.

As shown in FIG. 4, the flange portion 46a of the first body half 26a includes a flange surface 58a and a flange recessed portion 62a protruding radially inward towards axis 38 relative to the flange surface 58a. The flange surface 58a includes a plurality of flange apertures 66a (see FIG. 2) arranged radially around the flange surface 58a, which enables first body half 26a to couple to a pipe (not shown) through which the process fluid flows. The flange recessed portion 62a defines a valve bore $B_v$ and a flange recess surface 74a arranged substantially parallel to and recessed from the flange surface 58a. The flange recess surface 74a includes a first flange surface portion 75a, a second flange surface portion 76a, and a raised flange bead 78a arranged between the first flange surface portion 75a and the second flange surface portion 76a that protrudes from the flange recess surface 74a. The first flange surface portion 75a and the second flange surface portion 75b are coplanar and arranged substantially perpendicular to the axis 38. The raised flange bead 78a is arranged radially around the flange recess surface 74a and defines a substantially rectangular shape. In other embodiments, the raised flange bead 78a can define a substantially round shape, a substantially triangular shape, a substantially polygonal shape, or another suitable shape.

Figure 2:
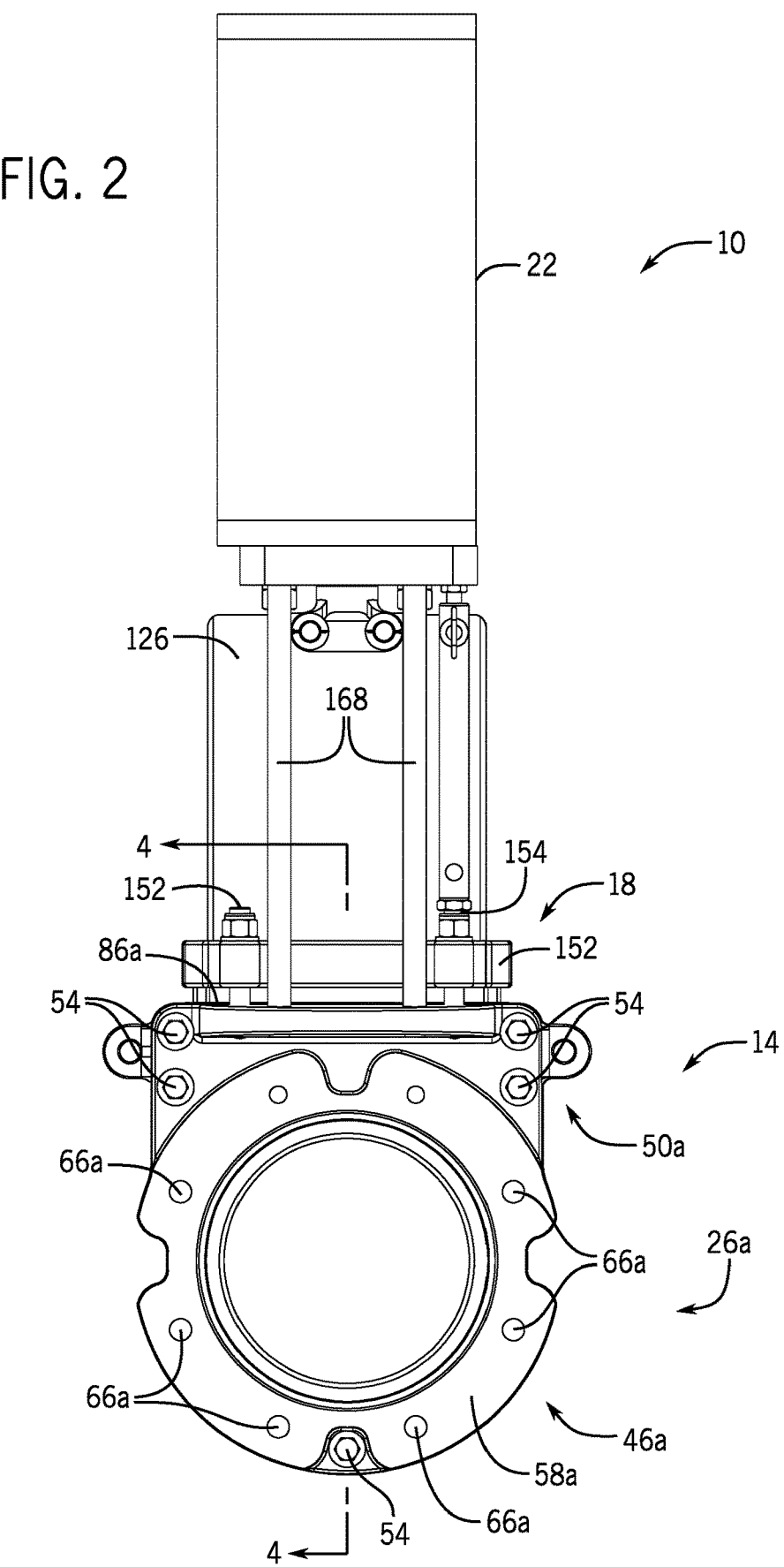
FIG. 2 is a front view of the knife gate valve of FIG. 1.

As shown in FIG. 3, the gland portion 50a of the first body half 26a includes a male gland follower 82a and a mounting surface 86a extending axially outward from the male gland follower 82a. The male gland follower 82a defines a conforming recess 90a which is configured to receive a portion of the liner 30. The mounting surface 86a includes a plurality of mounting apertures 92a for attaching the gland assembly 18 and the gate actuation mechanism 22 (as shown in FIGS. 1 and 2).

As also shown in FIG. 3, the liner 30 is a one-piece liner formed as a single piece of material and is configured to be received between the first body half 26a and the second body half 26b. In some embodiments, the liner 30 is fabricated from a polymeric material, such as polyurethane, that has a high resistance to abrasive and/or corrosive process flows. The liner 30 includes a first cylindrical portion 94a, a second cylindrical portion 94b symmetrical to the first cylindrical portion 94a, an upwardly extending chest portion 98, and a gate slot 102. Similar to the first body half 26a and the second body half 26b, the first cylindrical portion 94a and the second cylindrical portion 94b are symmetrical, and the following description of the first cylindrical portion 94a also applies to the second cylindrical portion 94b. Additionally, the first cylindrical portion 94a and the second cylindrical portion 94b include similar features which are identified with like reference numerals and distinguished by the suffix "a" and "b" in the figures.

As shown in FIG. 4, the first cylindrical portion 94a includes a liner bore surface 110a extending away from the gate slot 102 and a liner flange 114a extending substantially perpendicularly from the liner bore surface 110a. The liner bore surface 110a defines a liner bore $B_L$. The liner bore surface 110a and the liner flange 114a combine to form a liner recess 116a which is configured to receive the flange recessed portion 62a of the first body half 26a and place the liner flange 114a into engagement with the flange recess surface 74a.

As shown in FIG. 4, the upwardly extending chest portion 98 extends from the first cylindrical portion 94a and the second cylindrical portion 94b to a liner top flange 122 (see FIG. 3). The chest portion 98 is configured to be received within the conforming recesses 90a, 90b and the liner top flange 122 is configured to engage the male gland followers 82a, 82b, as shown in FIG. 3.

As further shown in FIG. 4, the gate slot 102 slidably receives a gate 126 of the knife gate valve 10. The gate slot 102 extends through the liner 30 from the liner top flange 122 (see FIG. 3) to a gate recess 130 arranged at the bottom of the liner 30 between the first and second cylindrical portions 94a, 94b in a direction perpendicular to the axis 38. The illustrated gate slot 102 defines a substantially rectangular shape to conform to the geometry of the gate 126. In other embodiments, the gate slot 102 can define another shape to conform to another geometry of the gate 126 to provide bi-directional flow.

Figure 5:
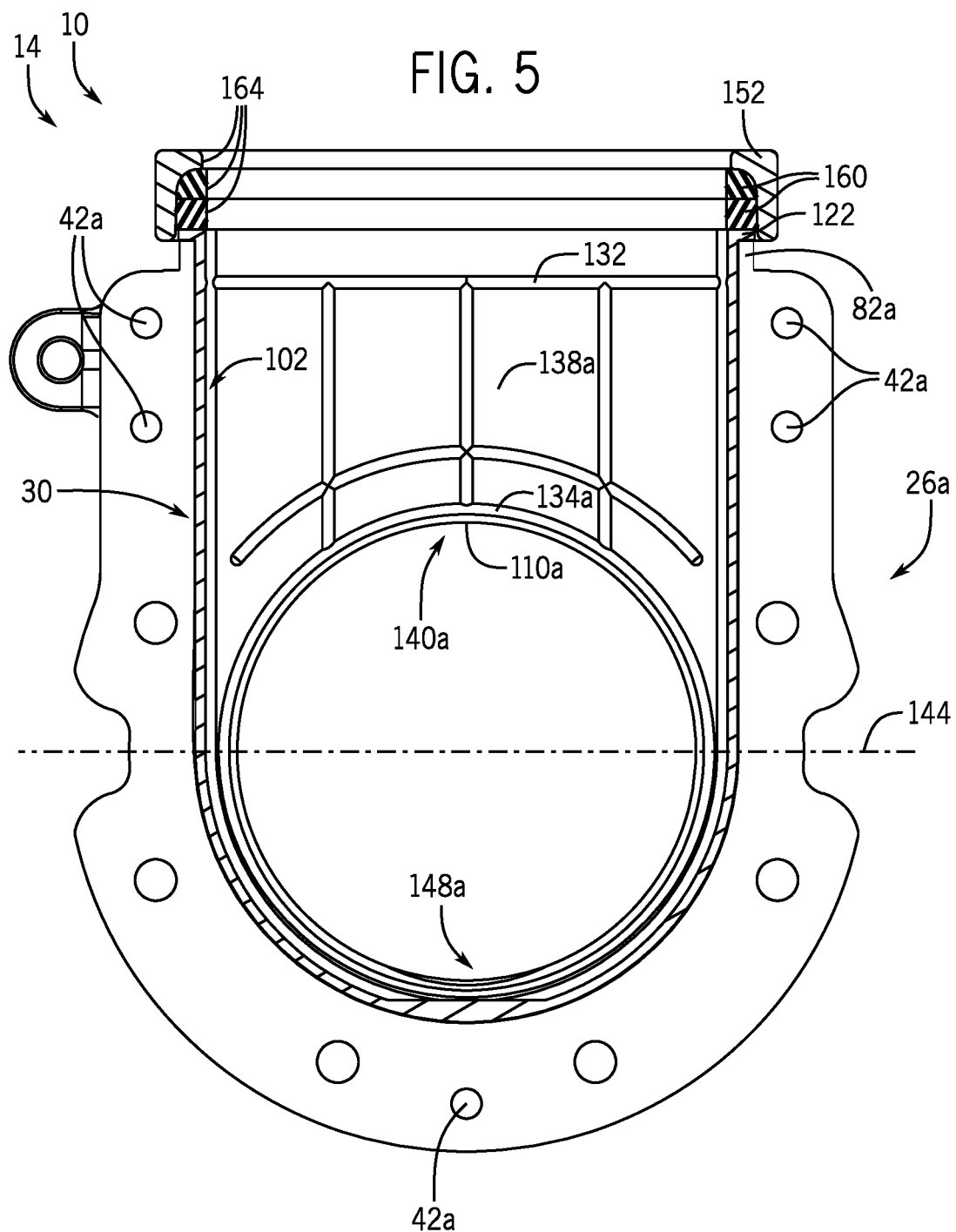
FIG. 5 is a cross-sectional view of the knife gate valve of FIG. 1 taken along line 5-5.

As shown in FIG. 5, the gate slot 102 includes a top sealing bead 132 arranged adjacent to the liner top flange 122, a first radial sealing bead 134a arranged adjacent to the liner bore surface 110a on a first longitudinal surface 138a of the gate slot 102, and a second radial sealing bead 134b (see FIG. 4) arranged adjacent to the liner bore surface 110b on a second longitudinal surface 138b of the gate slot 102. The first radial sealing bead 134a is symmetric to the second radial sealing bead 134b, and therefore, the following description of the first radial sealing bead 134a on the first longitudinal surface 138a also applies to the second radial sealing bead 134b on the second longitudinal surface 138b.

As shown in FIG. 4, first radial sealing bead 134a protrudes from and is arranged radially around the first longitudinal surface 138a. A distance that the first radial sealing bead 134a protrudes from the first longitudinal surface 138a is defined as a protrusion height. In one embodiment, the first radial sealing bead 134a defines a varying protrusion height that includes a maximum protrusion height $H_{max}$ at a top 140a of the first radial sealing bead 134a, a height $H_c$ at centerline 144 (see FIG. 5), and a minimum height $H_{min}$ at a bottom 148a of the first radial sealing bead 134a. The varying protrusion height of the first radial sealing bead 134a is described with reference to a percent decrease from $H_{max}$ defined by Equation 1 below:

$$\% \ Decrease from H_{max} = \frac{H_{max} - H_d}{H_{max}} * 100 \quad (1)$$

where $H_d$ is the protrusion height at a distance d along the first radial sealing bead 134a from the top 140a to the bottom 148a of the first radial sealing bead 134a.

Figure 6:
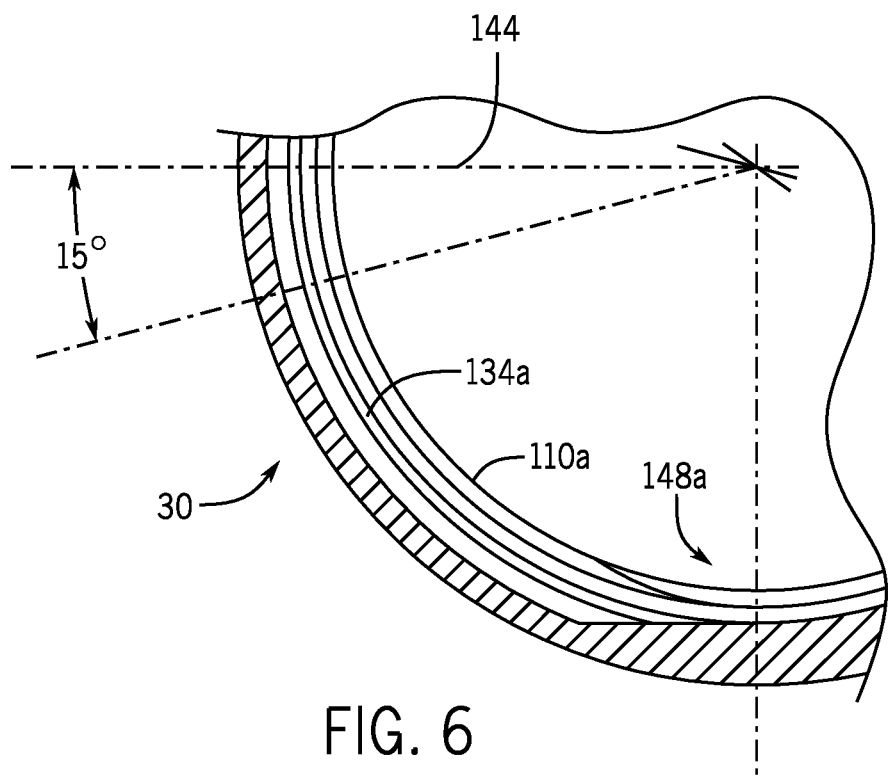
FIG. 6 is a front view of a portion of a liner of the knife gate valve of FIG. 1 according to one embodiment of the invention.
Figure 7:
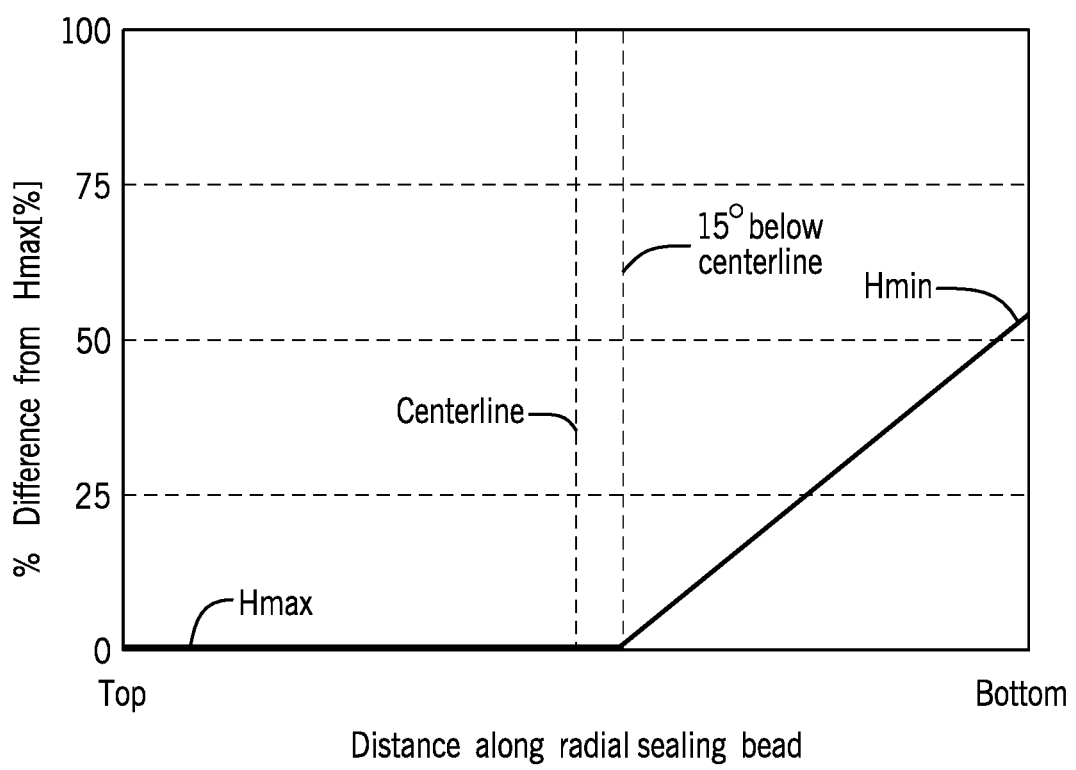
FIG. 7 is a graph illustrating a relationship between a percent decrease from a maximum protrusion height $H_{max}$ and distance along a first and second radial sealing bead of a liner of the knife gate valve of FIG. 1 according to one embodiment of the invention.

As shown in FIGS. 6 and 7, the protrusion height initially remains constant at $H_{max}$ and then begins to decrease at a location approximately fifteen degrees below the centerline 144. At the location approximately 15 degrees below the centerline 144, the protrusion height of the first radial sealing bead 134a starts to decrease substantially linearly to between approximately seventy-five percent and fifty percent from $H_{max}$. The protrusion height reaches $H_{min}$ at the bottom 148a of the first radial sealing bead 134a. In one embodiment, the minimum protrusion height $H_{min}$ has decreased approximately fifty-five percent from $H_{max}$.

Figure 8:
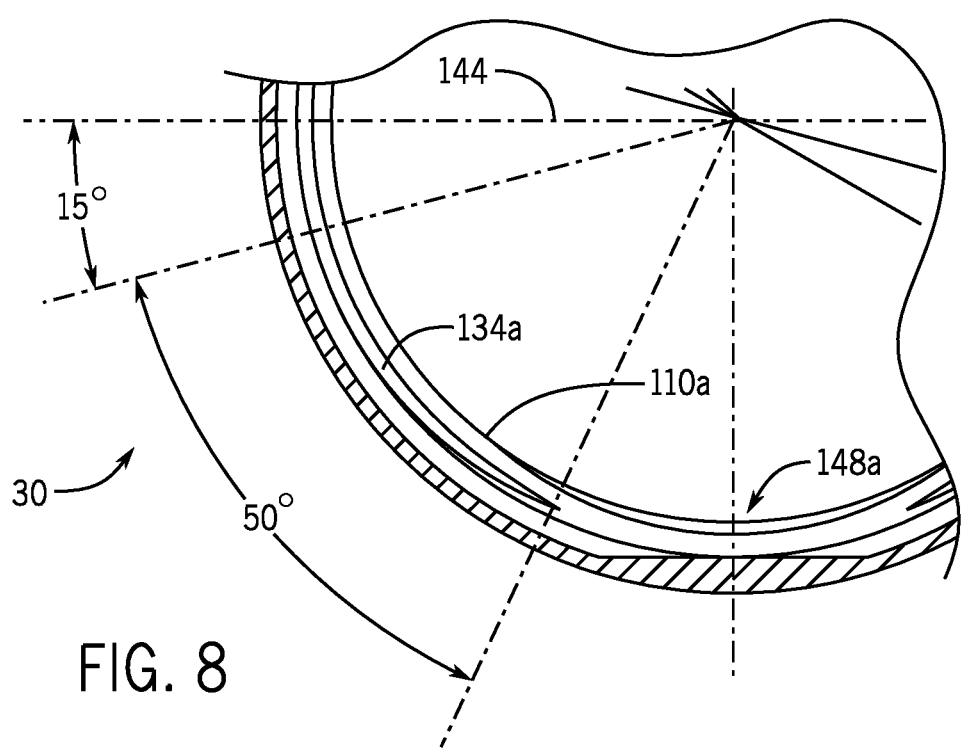
FIG. 8 is a front view of a portion of a liner of the knife gate valve of FIG. 1 according to another embodiment of the invention.
Figure 9:
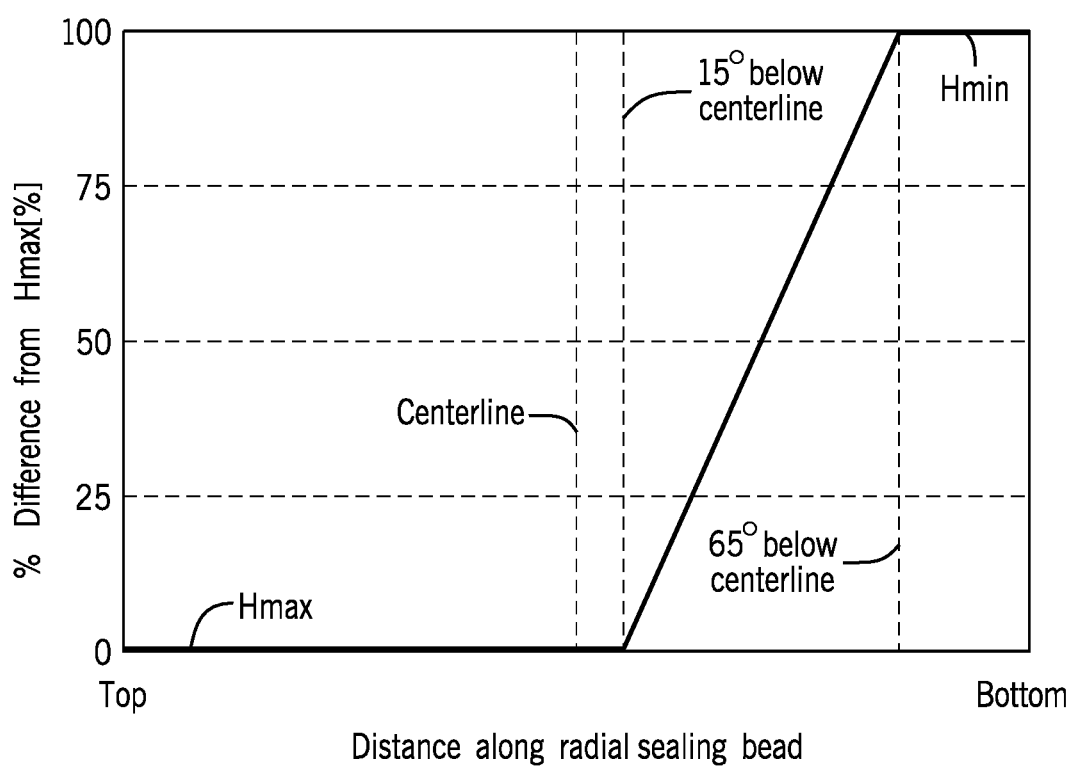
FIG. 9 is a graph illustrating a relationship between a percent decrease from a maximum protrusion height $H_{max}$ and distance along a first and second radial sealing bead of a liner of the knife gate valve of FIG. 1 according to another embodiment of the invention.

As shown in FIGS. 8 and 9, in another embodiment, the protrusion height initially remains constant at $H_{max}$ and then begins to decrease at a location approximately fifteen degrees below the centerline 144. The protrusion height decreases substantially linearly from $H_{max}$ at the location approximately 15 degrees below the centerline 144 to $H_{min}$ at a location approximately sixty-five degrees below the centerline 144. In one embodiment, the protrusion height of the first radial sealing bead 134a decreases between approximately seventy-five percent and one hundred percent from $H_{max}$. In another embodiment, the protrusion height of the first radial sealing bead 134a decreases approximately one hundred percent from $H_{max}$.

In some embodiments, the relationship between the percent decrease in the protrusion height from $H_{max}$ and the distance along the first radial sealing bead 134a can fall between the relationships shown in FIGS. 7 and 9. For example, the minimum protrusion height $H_{min}$ can be reached at a location between approximately sixty-five degrees below the centerline 144 and the bottom 148a, and decrease between approximately fifty percent and one hundred percent from $H_{max}$. In one embodiment, the protrusion height can decrease from $H_{max}$ starting above the centerline 144.

Although the profiles of the percent decrease in the protrusion height from $H_{max}$ as a function of the distance along the first radial sealing bead 134a, as shown in FIGS. 7 and 9, illustrate the protrusion height decreasing substantially linearly with distance, the protrusion height can alternatively define a step change or a non-linear relationship, as a function of distance along the first radial sealing bead 134a. Additionally, the profiles discussed above are only exemplary and other ranges and slopes/profiles of decreased bead height are contemplated. The invention generally provides a bead height that decreases in any manner between a top and a bottom of the first radial sealing bead 134a.

As shown in FIG. 3, the gland assembly 18 includes a gland box 152 attached to the mounting surfaces 86a, 86b of the first and second body halves 26a, 26b via fastening elements 154 (removed from FIG. 2 for clarity, see FIG. 1) inserted through gland mounting apertures 156 and into the mounting apertures 92a, 92b. The gland box 152 is configured to enclose one or more layers of packing 160 and compress the packing 160 against the liner top flange 122 which seals the liner top flange 122 between the male gland followers 82a, 82b and the packing 160. The gland box 152 and the packing 160 each include a gland slot 164 which is aligned with the gate slot 102 in the liner 30 and is configured to slidably receive the gate 126.

Figure 10:
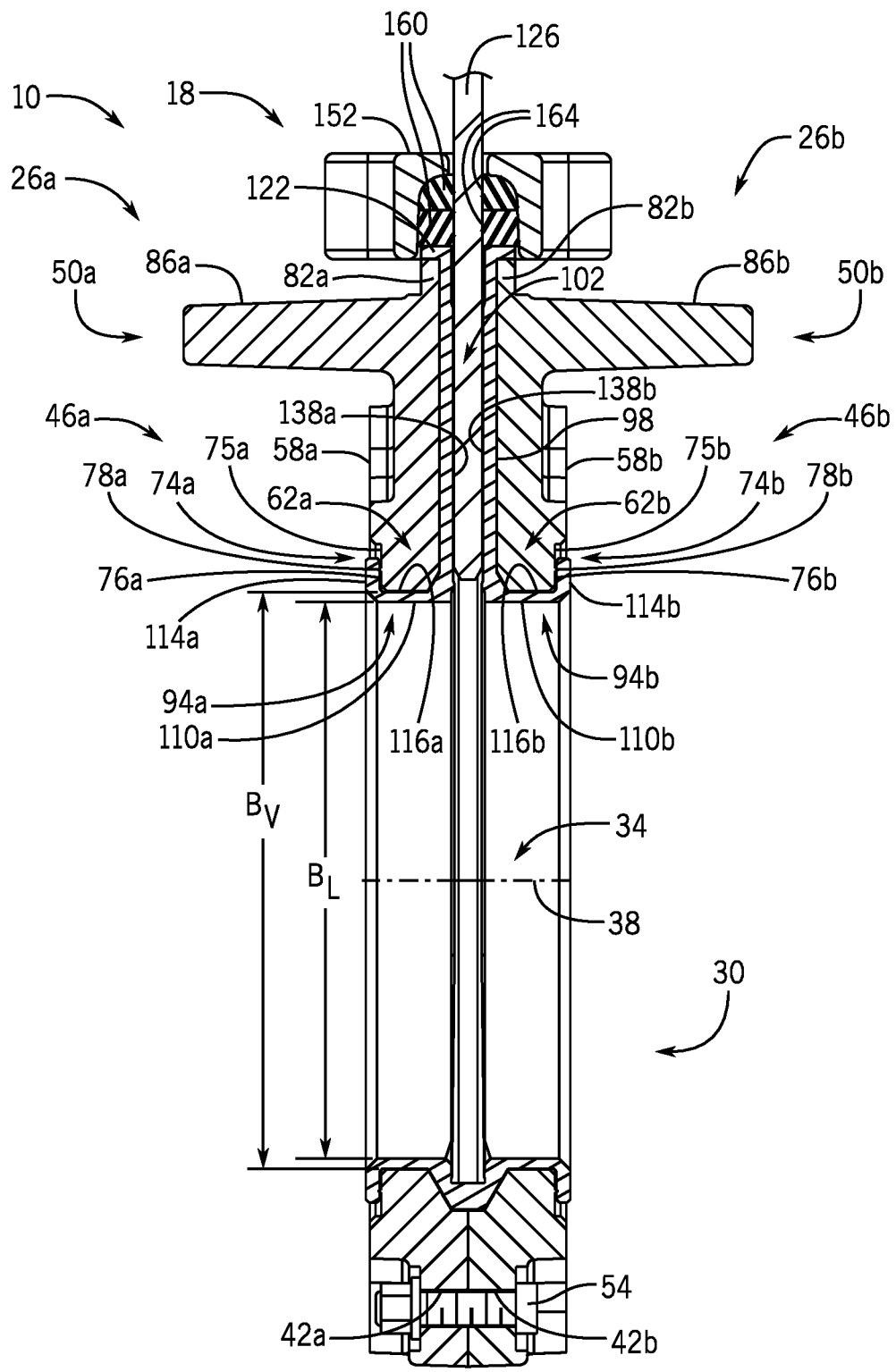
FIG. 10 is a cross-sectional view of the knife gate valve of FIG. 3 taken along line 4-4 with the gate in a first position.
Figure 11:
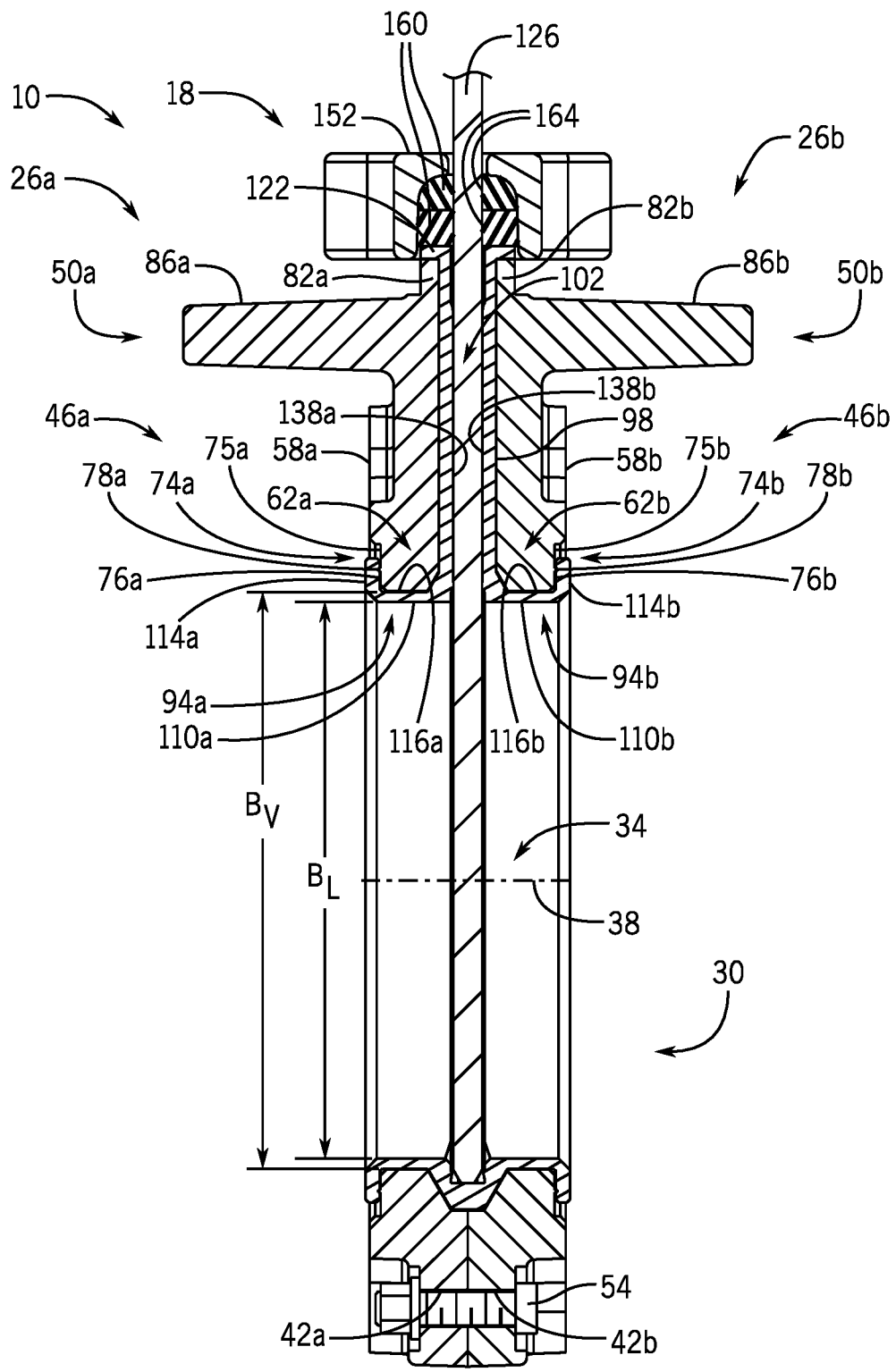
FIG. 11 is a cross-sectional view of the knife gate valve of FIG. 3 taken along line 4-4 with the gate in a second position.

As shown in FIG. 1, the gate actuation mechanism 22 is coupled to the gate 126 and attached to the mounting surfaces 86a, 86b of the first and second body halves 26a, 26b. The gate actuation mechanism 22 is configured to actuate the gate 126 between a first or open position (as shown in FIG. 10) where the gate 126 does not block any of the passageway 34 and process fluid is allowed to flow through the passageway 34 and a second or closed position (as shown in FIG. 11) where the gate 126 blocks the passageway 34 and process fluid is inhibited from flowing through the passageway 34. In some embodiments, the gate actuation mechanism 22 is an electronic actuator. In other embodiments, the gate actuation mechanism 22 can be a pneumatic actuator, a hand wheel and a threaded rod, or a lever.

Figure 12:
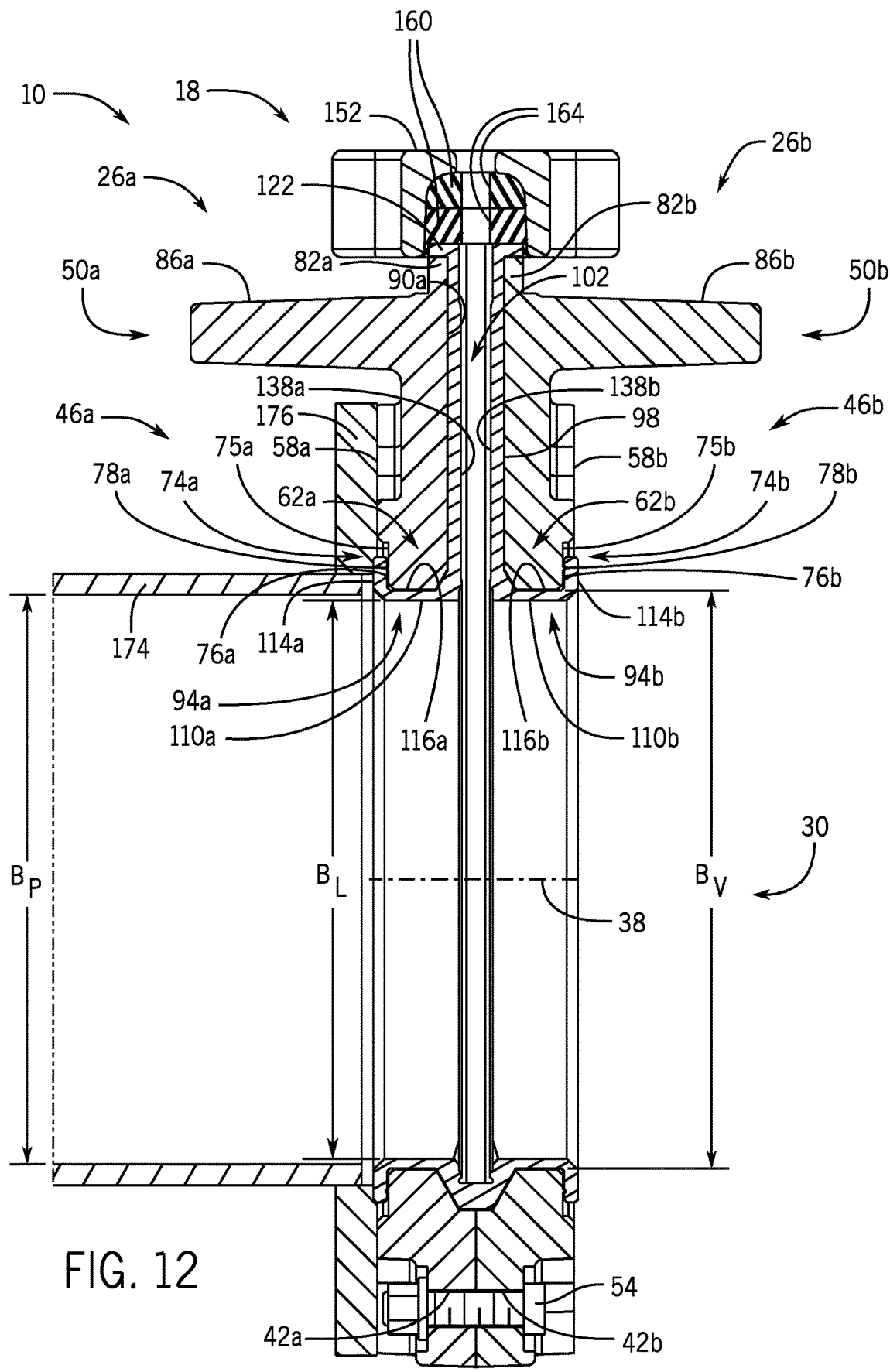
FIG. 12 is a cross-sectional view illustrating a pipe coupled to the knife gate valve of FIG. 1.

As shown in FIG. 12, the knife gate valve 10 is assembled by installing the liner 30 onto the first body half 26a by first manipulating the liner flange 114a through the smaller diameter of the valve bore By defined by the flange recessed portion 62a. Once the liner flange 114a is manipulated through the flange recessed portion 62a, it is then expanded to position the flange recessed portion 62a within the liner recess 116a and place the liner flange 114a into engagement with the raised flange bead 78a on the flange recess surface 74a. With the flange recessed portion 62a positioned within the liner recess 116a, the chest portion 98 is also positioned within the conforming recess 90a and the liner top flange 122 is placed into engagement with the male gland follower 82a. In one embodiment, the liner 30 can be fabricated from polyurethane which provides the liner 30 with the flexibility to be manipulated through the valve bore $B_v$ and the rigidity to not permanently deform during the manipulation through the valve bore $B_v$.

A similar process is used to install the liner 30 onto the second body half 26b, as the second body half 26b and the second cylindrical portion 94b are symmetrical to the first body half 26a and the first cylindrical portion 94a, respectively. Once the liner 30 is installed onto both the first and second body halves 26a, 26b, the liner 30 is arranged between the first and second body halves 26a, 26b and the fastening elements 54 are installed through the joining apertures 42a, 42b and tightened to join the first body half 26a and the second body half 26b. This completes assembly of the valve body assembly 14 and the gland assembly 18 is then installed onto the valve body assembly 14 by first placing the packing 160 on the liner top flange 122 so that the gland slot 164 aligns with the gate slot 102. The gland box 152 is then installed over the packing 160 and the gate 126 is installed through the gland slot 164 and the gate slot 102. Once the gate 126 is installed, the fastening elements 154 are positioned, as shown in FIG. 1, then inserted though the gland mounting apertures 156 and into the corresponding mounting apertures 92a, 92b and then tightened to compress the packing 160 against the gate 126 and seal the liner top flange 122 between the packing 160 and the male gland followers 82a, 82b.

As shown in FIG. 1, the gate actuation mechanism 22 is then coupled to the gate 126 and attached to the first and second valve body halves 26a and 26b via rods 168 received within the corresponding mounting apertures 92a, 92b. The rods 168 provide enough clearance between the gate actuation mechanism 22 and the mounting surfaces 86a, 86b so that the gate 126 can actuate between the open position and the closed position.

As shown in FIG. 12, a pipe 174 is coupled to the first body half 26a using a pipe flange 176. The pipe flange 176 is fastened to the flange surface 58a via the plurality of flange apertures 66a (see FIG. 1). In some embodiments, the pipe flange 176 arrangement is a "slip on flange." The pipe flange 176 defines a pipe flange bore $B_p$ that is greater in diameter than the liner bore $B_L$. The liner flange 114a is not supported all the way to the liner bore $B_L$ by the pipe flange 176. In other words, due to the design of slip on flanges, a portion of the liner flange 114a is not in contact with the pipe flange 176. Typically, knife gate valves with replaceable liners are not able to seal properly with a slip on flange.

As also shown in FIG. 12, once the pipe flange 176 is fastened to the flange surface 58a, the pipe flange 176 compresses the liner flange 114a against the flange recess surface 74a and the raised flange bead 78a. The raised flange bead 78a provides a localized area of higher compression (e.g., a line contact seal) which prevents the liner flange 114a from moving and forms an integral seal between the liner flange 114a and the flange recess surface 74a. The pipe flange 176 compresses the liner flange 114a substantially perpendicularly against the first flange surface portion 75a, the second flange surface portion 76a, and the raised flange bead 78a of the flange recess surface 74a. As the first flange surface portion 75a and the second flange surface portion 76a are coplanar and arranged substantially perpendicular to the axis 38. This aids in inhibiting the liner flange 114a from creeping, or moving, under load from the pipe flange 176 or the process fluid. In addition to enabling the knife gate valve 10 to be operable with a slip on flange, the raised flange bead 78a eliminates the need for a separate gasket to be placed between the pipe flange 176 and the flange surface 58a.

Another pipe can be coupled to the second body half 26b using another pipe flange to allow process fluid to be carried after flowing through the passageway 34. Additionally, the second body half 26b and the second cylindrical portion 94b are symmetrical to the first body half 26a and the first cylindrical portion 94a, respectively. Therefore, the preceding description also applies to the second body half 26b and the second cylindrical portion 94b of the liner 30. Furthermore, the first body half 26a and the second body half 26b are capable of coupling to other, non-slip on pipe flanges that define a pipe bore $B_p$ that is less than or equal to the liner bore $B_v$.

As shown in FIG. 4, during operation, the process fluid imparts a differential pressure across the gate 126 of the knife gate valve 10 when the gate 126 is in the closed position. The differential pressure across the gate 126 causes the gate 126 to seal against either the first radial sealing bead 134a or the second radial sealing bead 134b, depending on the direction force provided by the differential pressure, preventing process fluid from leaking past or along the gate 126. As the differential pressure across the gate 126 increases, the gate 126 can deflect. For example, the gate 126 can engage the top 140a of the first radial sealing bead 134a and deflect to engage the bottom 148b of the second radial sealing bead 134b. Since the gate 126 is supported by the chest portion 98 of the liner 30, deflection of the gate 126 is typically at a maximum towards the bottom 148a, 148b of the first and second radial sealing beads 134a, 134b.

The first and second radial sealing beads 134a, 134b define a decreasing protrusion height from a maximum protrusion height $H_{max}$ at the top 140a, 140b of the first and second radial sealing beads 134a, 134b to a minimum protrusion height $H_{min}$ at the bottom 148a, 148b of the first and second radial sealing beads 134a, 134b. The varying height of the first and second radial sealing beads 134a, 134b enable the liner 30 to use the deflection of the gate 126 to increase sealing with increased differential pressure. This is achieved because the first and second radial sealing beads 134a, 134b define a maximum protrusion height $H_{max}$ where deflection of the gate 126 is at a minimum and define a minimum protrusion height $H_{min}$ where deflection of the gate 126 is at a maximum.

Simultaneously, the varying height of the first and second radial sealing beads 134a, 134b maintains a minimum valve closing force while deflection of the gate 126 increases with increased differential pressure. The valve closing force is the force necessary to move the gate 126 from the open position to the closed position. When the gate 126 is moving towards the closed position, and the differential pressure causes the gate 126 to deflect, a leading edge 172 of the gate 126 must overcome the protrusion height at the bottom 148a, 148b of the first radial sealing bead 134a or the second radial sealing bead 134b, depending on the direction of the deflection of the gate 126, to reach the closed position. The protrusion height at the bottom 148a, 148b of the first and second radial sealing beads 134a, 134b is the minimum protrusion height $H_{min}$ which minimizes the valve closing force and still provides an effective seal.

An integral seal is formed between the liner flanges 114a, 114b and the flange recess surfaces 74a, 74b and the liner top flange 122 is sealed between the packing 160 and the male gland followers 82a, 82b. These seals enable the liner 30 to completely isolate the valve body halves 26a, 26b from process fluid flowing through the passageway 34. This protects the valve body halves 26a, 26b from coming into contact with the process fluid which can be highly abrasive and/or corrosive, and enables the knife gate valve 10 to be reused while only requiring the liner 30 to be replaced as the process fluid begins to wear the liner 30 down.

The symmetry defined by the first and second body halves 26a, 26b, the first and second cylindrical portions 94a, 94b, and the first and second radial sealing beads 134a, 134b enables the knife gate valve 10 to achieve bi-directional sealing in either flow direction (i.e., from the first body half 26a towards the second body half 26b or from the second body half 26b towards the first body half 26a).

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A housing assembly for a knife gate valve with a knife gate, the housing assembly comprising:
   a valve body assembly defining a passageway having an axis and including a first body half and a second body half, each including a flange recessed portion defining a flange recess surface, each flange recess surface including a first flange surface portion, a second flange surface portion, and a raised flange bead arranged between the first flange surface portion and the second flange surface portion; and
   a one-piece liner arranged between the first body half and the second body half and including a first liner flange engaged with the first flange surface portion, the raised flange bead, and the second flange surface portion of the first body half, and a second liner flange engaged with the first flange surface portion, the raised flange bead, and the second flange surface portion of the second body half,
   wherein a first part of the one-piece liner includes:
   a first chest portion that engages the knife gate and an inside surface of the flange recessed portion of the first body half;
   a first liner bore portion that extends between the first chest portion and the first liner flange and that engages a radially inner surface of the flange recessed portion of the first body half; and
   a first sealing bead that is configured to engage the knife gate and extends circumferentially around the passageway, wherein the first sealing bead defines a varying protrusion height as the first sealing bead extends around the passageway.

2. The housing assembly of claim 1, wherein the first flange surface portion and the second flange surface portion of the first body half are at least one of coplanar and arranged substantially perpendicular to the axis, and the first flange surface portion and the second flange surface portion of the second body half are at least one of coplanar and arranged substantially perpendicularly to the axis.

3. The housing assembly of claim 1, wherein a second part of the one-piece liner includes a second chest portion that engages an inside surface of the flange recessed portion of the second body half, and a second liner bore portion that extends from the second chest portion and from the second liner flange and that engages a radially inner surface of the flange recessed portion of the second body half.

4. The housing assembly of claim 1, wherein the one-piece liner includes a liner top flange.

5. The housing assembly of claim 4, further comprising a gland assembly including at least one packing layer enclosed by a gland box, the gland box sealing the liner top flange between the at least one packing layer and a male gland follower of the first body half and the second body half.

6. The housing assembly of claim 1, wherein the raised flange bead of the first body half defines a substantially rectangular shape in cross-section, and the raised flange bead of the second body half defines a substantially rectangular shape in cross-section.

7. The housing assembly of claim 1, wherein the raised flange bead of the first body half engages the first liner flange to provide a first line contact seal, and the raised flange bead of the second body half engages the second liner flange to provide a second line contact seal.

8. The housing assembly of claim 1, wherein the first body half is configured to receive a first pipe flange and the raised flange bead of the first body half enables a first integral seal to be formed between the first pipe flange and the first body half, and the second body half is configured to receive a second pipe flange and the raised flange bead of the second body half enables a second integral seal to be formed between the second pipe flange and the second body half.

9. The housing assembly of claim 1, wherein the protrusion height of the first sealing bead varies from a maximum height at a top of the passageway to a minimum height at a bottom of the passageway.

10. The housing assembly of claim 9, wherein the protrusion height begins to decrease from the maximum height at an angular offset below a centerline defined by the passageway and reaches the minimum height at or an angular offset above the bottom of the passageway.

11. A housing assembly for a knife gate valve with a knife gate, the housing assembly comprising:
   a valve body assembly that defines a passageway having an axis and includes a first body and a second body, each of the first body and the second body including a flange surface and a flange recessed portion that protrudes radially inward relative to the flange surface; and
   a one-piece liner arranged between the first body and the second body, the one-piece liner defining:
   a first liner recess that receives and wraps around the flange recessed portion of the first body;
   a second liner recess that receives and wraps around the flange recessed portion of the second body;
   a chest portion that extends from the first and second liner recesses to engage the knife gate;
   a first sealing bead protruding axially away from the flange recessed portion of the first body and extending circumferentially around the passageway, wherein an axial height of the first sealing bead varies as the first sealing bead extends around the passageway; and a second sealing bead protruding axially away from the flange recessed portion of the second body and extending circumferentially around the passageway, wherein an axial height of the second sealing bead varies as the second sealing bead extends around the passageway.

12. The housing assembly of claim 11, wherein a raised flange bead of the first body engages a first liner flange of the one-piece liner to provide a first line contact seal, and a raised flange bead of the second body engages a second liner flange of the one-piece liner to provide a second line contact seal.

13. The housing assembly of claim 12, wherein the raised flange bead of the first body defines a substantially rectangular shape in cross-section, and the raised flange bead of the second body defines a substantially rectangular shape in cross-section.

14. The housing assembly of claim 11, wherein a first flange surface portion and a second flange surface portion of the first body are at least one of coplanar and arranged substantially perpendicular to the axis, and wherein a first flange surface portion and a second flange surface portion of the second body are at least one of coplanar and arranged substantially perpendicular to the axis.

15. The housing assembly of claim 11, wherein the axial height of the first sealing bead and the second sealing bead decreases from a maximum height to a minimum height over a predefined angular distance.

16. The housing assembly of claim 15, wherein the predefined angular distance begins at a first angular offset below a centerline defined by the passageway and ends at a second angular offset above a bottom of the passageway.

17. A housing assembly for a knife gate valve, the housing assembly comprising:

a valve body assembly that defines a passageway having an axis and includes a first body and a second body, each of the first body and the second body including a flange surface and a flange recessed portion that protrudes radially inward relative to the flange surface, each of the flange recessed portions including a flange recessed surface that includes a first flange surface portion, a second flange surface portion, and a raised flange bead arranged between the first flange surface portion and the second flange surface portion; and a one-piece liner arranged between the first body and the second body, the one-piece liner including a first liner bore surface, a first liner flange, a second liner bore surface, a second liner flange, a chest portion, and a gate slot, the gate slot including a first sealing bead arranged on a first inner surface of the gate slot radially outwardly from the first liner bore surface and a second sealing bead arranged on a second inner surface of the gate slot radially outwardly from the second liner bore surface;

the first sealing bead defining a varying axial height as the first sealing bead extends circumferentially around the first inner surface; and the second sealing bead defining a varying axial height as the second sealing bead extends circumferentially around the second inner surface.

18. The housing assembly of claim 17, wherein the first flange surface portion and the second flange surface portion of the first body are at least one of coplanar and arranged substantially perpendicular to the axis, and wherein the first flange surface portion and the second flange surface portion of the second body are at least one of coplanar and arranged substantially perpendicular to the axis.

19. The housing assembly of claim 18, wherein the raised flange bead of the first body defines a substantially rectangular shape in cross-section, and the raised flange bead of the second body defines a substantially rectangular shape in cross-section.

20. The housing assembly of claim 17, wherein the axial height of the first sealing bead and the second sealing bead varies linearly from a maximum height to a minimum height.

\* \* \* \* \*

UNITED STATES PATENT AND TRADEMARK OFFICE
CERTIFICATE OF CORRECTION

PATENT NO. : 10,746,306 B2  
APPLICATION NO. : 16/210880  
DATED : August 18, 2020  
INVENTOR(S) : Darren Parson et al.

Page 1 of 1

It is certified that error appears in the above-identified patent and that said Letters Patent is hereby corrected as shown below:

In the Specification

Column 7, Line 1, "bore By defined" should be --bore $B_v$ defined--.

Signed and Sealed this
Twenty-seventh Day of October, 2020

Andrei Iancu
*Director of the United States Patent and Trademark Office*